United States Patent
Friess et al.

(10) Patent No.: US 8,301,599 B2
(45) Date of Patent: Oct. 30, 2012

(54) CLUSTER ARRANGEMENT

(75) Inventors: Bernhard Friess, Retsch (DE); Grana Nawabi, Bad Schönborn (DE); Rudi Kraus, Ellerstadt (DE)

(73) Assignees: Atos IT Solutions and Services GmbH, Munich (DE); Fujitsu Siemens Computers GmbH, Munich (DE)

( * ) Notice: Subject to any disclaimer, the term of this patent is extended or adjusted under 35 U.S.C. 154(b) by 188 days.

(21) Appl. No.: 11/312,209

(22) Filed: Dec. 19, 2005

(65) Prior Publication Data

US 2006/0161637 A1 Jul. 20, 2006

Related U.S. Application Data

(63) Continuation of application No. PCT/DE2004/000530, filed on Mar. 16, 2004.

(30) Foreign Application Priority Data

Jun. 18, 2003 (DE) .................................. 103 27 601
Jul. 4, 2003 (DE) .................................. 103 30 322

(51) Int. Cl.
*G06F 7/00* (2006.01)
*G06F 17/00* (2006.01)

(52) U.S. Cl. ........ 707/636; 707/611; 707/612; 707/613; 707/622; 709/203; 709/222; 709/224

(58) Field of Classification Search .................. None
See application file for complete search history.

(56) References Cited

U.S. PATENT DOCUMENTS

| | | | |
|---|---|---|---|
| 6,338,112 B1 * | 1/2002 | Wipfel et al. ................. | 709/223 |
| 6,393,485 B1 * | 5/2002 | Chao et al. .................... | 709/231 |
| 6,393,538 B2 * | 5/2002 | Murayama ............. | 707/999.204 |
| 6,438,705 B1 | 8/2002 | Chao et al. | |
| 6,816,891 B1 * | 11/2004 | Vahalia et al. ................ | 709/214 |
| 6,952,766 B2 * | 10/2005 | Dervin et al. ................. | 709/222 |
| 6,977,740 B1 * | 12/2005 | Mandalia ........................ | 707/10 |
| 7,096,248 B2 * | 8/2006 | Masters et al. ................ | 709/201 |
| 7,206,805 B1 * | 4/2007 | McLaughlin, Jr. .............. | 707/10 |
| 7,529,822 B2 * | 5/2009 | Joshi et al. .................... | 709/223 |

(Continued)

FOREIGN PATENT DOCUMENTS

FR 2 816 410 5/2002

(Continued)

OTHER PUBLICATIONS

J. Rodman et al., "Linux FailSafe™ Administrator's Guide", pp. 1-191, XP-002373797, Oct. 5, 2000.

(Continued)

*Primary Examiner* — Jau-Shya Meng
(74) *Attorney, Agent, or Firm* — Cozen O'Connor

(57) ABSTRACT

A cluster arrangement having a first network, at least two data processing systems which each form an application node and which each have an operating system, and an application agent on each application node, which application agent is operable to monitor and identify entities executed on the application node; start a new entity or restart an entity which has been terminated prematurely on the application node; assess and decide whether it is possible to execute a new entity on the application node; send a request for execution of an entity to application agents at application nodes connected to the network; and report to application agents at application nodes connected to the network following an acceptance of the request for execution of an entity.

34 Claims, 7 Drawing Sheets

U.S. PATENT DOCUMENTS

| | | | |
|---|---|---|---|
| 2002/0038296 A1* | 3/2002 | Margolus et al. | 707/1 |
| 2002/0095400 A1* | 7/2002 | Johnson et al. | 707/1 |
| 2002/0133491 A1* | 9/2002 | Sim et al. | 707/10 |
| 2002/0143734 A1* | 10/2002 | Loy et al. | 707/1 |
| 2004/0122917 A1* | 6/2004 | Menon et al. | 709/219 |
| 2005/0055322 A1* | 3/2005 | Masters et al. | 707/1 |

FOREIGN PATENT DOCUMENTS

| | | |
|---|---|---|
| FR | 2 816 419 | 5/2002 |
| JP | 10187638 | 7/1998 |
| JP | 2002-269060 | 9/2002 |
| TW | 523656 | 3/2003 |

OTHER PUBLICATIONS

Condor Team, "Condor® Version 6.2.2 Manual", University of Wisconsin-Madison, Version 622, XP-002336280, pp. 1-9, 21, 34, 35, 42-49, 55-59, 90, 93, 94, 99, 183-185.

Anonymous, "LSF Batch User's Guide", 6th edition, Platform Computing Corporation, XP-002336279, Aug. 1998, pp. 1-33, 46-58, 98-100, 174, 187-193.

Search Report dated May 26, 2006 for International Application No. PCT/DE2004/000530.

International Preliminary Report on Patentability dated Jul. 24, 2006 for International Application No. PCT/DE2004/000530.

An-Chow Lai et al., "Load Balancing in Distributed Shared Memory Systems", Performance, Computing, and Communications Conference, 1997, IEEE International, Pheonix, Tempe, AZ Feb. 5-7, 1997, pp. 152-158.

Kuhn B., "Mosix-Cluster mit Lunix: Zwischen Multiprocessing und Cluster-Computing", Linux Magazin, pp. 1-7, Jun. 2000.

Dandamudi S P, "Sensitivity Evaluation of Dynamic Load Sharing in Distributed Systems", IEEE Concurrency, IEEE Service Center, Piscataway, NY, vol. 6, No. 3, Jul. 1998, pp. 62-72.

English translation of "Notification for the Opinion of Examination" issued in a corresponding Taiwanese application No. 93117266 mailed Apr. 18, 2011.

* cited by examiner

CLUSTER ARRANGEMENT

RELATED APPLICATIONS

This is a continuation of International Application No. PCT/DE2004/000530, filed on Mar. 16 2004, which claims priority from German application nos. 103 27 601.7 and 103 30 322.7 filed Jun. 18, 2003 and Jul. 4, 2003, respectively, the contents of which are hereby incorporated by reference.

FIELD OF THE INVENTION

The invention relates to a cluster arrangement and to a method in a cluster arrangement comprising at least two application nodes and an inspection node, which are connected to a network.

BACKGROUND OF THE INVENTION

A complex comprising a plurality of network computers which jointly perform a set task is called a cluster. In this context, the task to be performed is broken down into small task elements and these are distributed over the individual computers. A known type of cluster is Biowulf clusters, which are used particularly for tasks which involve a large amount of computation. In another form of cluster, it is not the computation speed but rather the availability of the cluster which is in the foreground. With this form of cluster, it is necessary to ensure that if one computer within the cluster fails then the other computers undertake the tasks of the failed computer with no or with just little time loss if at all possible. Examples of such clusters are web servers within the Internet or else applications with central data storage using a relational database.

Clusters which operate in this manner are also called high-availability clusters and have a plurality of individual servers which are connected to one another via a network. Each server forms a node in the cluster. Servers which handle applications are called application nodes, and servers with central management, control or inspection tasks form inspection nodes. On the application nodes, various applications or various application elements in a large application are executed, with the individual applications being able to be connected to one another. Further computers outside the cluster, called clients, access the applications running within the cluster and retrieve data.

Besides the application node, such a cluster contains the inspection node, which is a central entity. The inspection node monitors the applications running on the individual application nodes, terminates them if appropriate or restarts them. If an application node fails, the central entity restarts the failed applications on the other application nodes. To this end, it selects a node which still has sufficient capacity. Depending on the configuration and utilization level of the cluster, this involves the use of an application node which has not been used to date or the computation load of the applications which are to be restarted is distributed as evenly as possible, an operation which is called load balancing.

To protect the central entity or the inspection nodes, for their part, against failure, it is necessary to provide them in redundant form, usually using further servers which mirror the central entity. However, such a cluster solution has the drawback that the data interchange between application nodes and the central entity is very great. In addition, each application node uses up computation time to respond to the requests from the central entity. Since the central entity also needs to be able to handle every possible failure scenario, the configuration complexity and the associated risk of an incorrect configuration rise considerably.

SUMMARY OF THE INVENTION

One object of the present invention is to provide a cluster arrangement which can be operated with significantly lower configuration complexity.

This and other objects are attained in accordance with one aspect of the present invention directed to a cluster arrangement having a first network, at least two data processing systems which each form an application node and which each have an operating system. Each application node has an application agent and at least one application node has an entity which is executed. The application agent contains at least the following functions:

monitoring of the operability and correct operation of all the entities executed on the application node;

independent starting of a new entity or restarting of an entity which has been terminated prematurely on the application node;

assessing and deciding whether it is possible to execute a new entity on the application node;

putting a request for execution of an entity to application agents at application nodes connected to the network; and reporting to application agents at application nodes connected to the network following an acceptance of the request for execution of an entity.

On every application node, there is an application agent or a program which operates independently and regardless of the application agents on other application nodes and of a central entity. In particular, it is designed for independent decision-making regarding whether it is possible to start or execute a new entity. The application agent performs this function when the application agent receives a request for execution of an entity or when it is necessary to execute an entity for correct operation. The assessment is expediently made by including a recollection, the information contained in the request and previously defined rules. The application agent's recollection is designed such that it contains information about a past operating state.

In addition, the application agent has a function for putting a request to other application agents. This allows the agent to send the entities executed on the application node to other application nodes independently and regardless of a central entity when there is the threat of failure. Alternatively, this function can also be used to send a request for execution of an entity to other application agents. The function is designed such that it provides all the parameters for correct operation of the entity which is to be executed.

In particular, the application agent can use these functions to perform independent load balancing which is limited to the application node.

The provision of the application agents on each application node relieves the load on a central entity, reduces the data traffic between central entity and application nodes and moves the monitoring functions to the application nodes. The application agents are autonomous for their part.

It is expedient to provide a function in the application agent which generates a report to application agents at other application nodes if the application agent rejects a request for execution of an entity.

It is particularly advantageous if the monitoring function of the application agent on the application node comprises the compilation of a list. The list contains entities which are respectively executed on the application node and all the data and parameters which are required for executing the executed entities. Expediently, the list is divided into list elements, with each list element containing the data for one entity. In addition, it is advantageous if this list also contains information and operating parameters about the application node. These are advantageously used for an assessment about a possible execution. In this way, a request is put to further application agents at application nodes connected to the network in a particularly simple manner by sending a list or a list element.

In one development of the invention, the cluster arrangement has a memory device which is connected to the first network. The memory device is designed for access by the application nodes. The memory device contains at least one entity which can be executed on an application node. This makes it possible for the application nodes in the cluster arrangement to access an entity within the memory device and to load it for execution. It is expedient to store all the data in the memory device and to allow all the application nodes to use the latter. This jointly used memory reduces the costs and simplifies the maintenance of the cluster arrangement.

In this connection, it makes sense if the memory device stores the operating system for the application nodes. This does not require the operating system to be installed individually on every application node, but rather the operating system is loaded from the memory device upon an initialization operation at an application node. Updates or alterations to the operating system can thus be easily performed. In this context, it is particularly expedient if the application agent at each application node is a service of the operating system running on the application node. The application agent is stored in the jointly used memory device. Appropriately, it is started automatically when an application node is initialized.

In one embodiment of the cluster arrangement, an application node is provided on which it is possible to execute a new entity. The cluster arrangement thus always contains an application node which, if an application node has failed, undertakes the applications running on the failed node.

In one advantageous development, the cluster arrangement has at least one data processing system which is in the form of an inspection node and which is connected to the first network. The inspection node has an operating system and an inspection agent which comprises the following functions:

checking the operability of the application nodes which are connected to the first network;

putting a request for execution of an entity to application agents at application nodes connected to the network;

determining an application node and putting a request for execution of a new entity to this application node.

Such an inspection agent on the inspection node significantly reduces the data interchange between application and inspection nodes. In particular, it is possible to check the operability of the application nodes using a simple periodic presence test. In one appropriate refinement, the application agent at an application node is checked for its presence and its operability by the inspection agent. A check for individual entities is dispensed with, since this is performed by the application agent. In the event of total failure of an application node, the inspection agent determines a new application node for executing the failed entities. This means that correct operation is always ensured.

It is advantageous if when checking the application nodes it is possible to ascertain the application nodes to be checked using the lists compiled by the application agents at the application nodes. In this case, the list compiled by the application agents at the application nodes is made available to the inspection agent, which evaluates it. The list provides the inspection agent with knowledge about the application nodes which are present within the cluster arrangement. An active search for nodes which are present in the cluster arrangement can thus be dispensed with. In particular, further application nodes in the cluster arrangement can easily be added in the case of this refinement of the inventive arrangement. When the list has been transmitted to the inspection agent, there is a periodic check on the new application node.

It is expedient if the request for execution of an entity comprises a compiled list element from an application agent at an application node. The function of requesting execution is expediently in the same form in the inspection agent and in the application agent.

In one expedient development of the invention, the list compiled by the application agents and/or the request for execution and/or the report is/are stored as at least one file in the memory device following an acceptance of the request for execution. This allows access and autonomous evaluation by every application agent without the presence of a central or inspection entity. In addition, a request is advantageously signaled by simple provision of a list in a memory area in the memory device, and the report following an acceptance is signaled by the removal of this list.

One development of the invention involves each entity stored in the memory device having a unique identifier which is allocated to the application node on which the entity is executed. This makes it possible to execute any entity on any application node regardless of further entities which are already being executed. A first entity accesses a second entity using the unique identifier. This means that the individual entities and the application agents require no knowledge about the structural design of the cluster arrangement. It is naturally possible for a node to have a plurality of associated identifiers if a plurality of entities are executed on this node. In one embodiment, the unique identifier is a virtual IP address.

It is advantageous to design the first network for communication with the TCP/IP or with the NFS protocol. Both protocols allow a multiplicity of data transmission and management options and can be implemented in a particularly simple manner.

In this connection, it is expedient if at least one inspection node has means for controlling an initialization operation at the application nodes, with the initialization operation containing a command for loading the operating system of the application node. Hence, the means of the inspection node starts an initialization operation on an application node which results in the operating system being loaded. In particular, it is possible to transfer specific commands or parameters for the application nodes during the initialization operation.

In one development of the invention, the at least two application nodes and the at least one inspection node in the cluster arrangement are connected to a second network which is coupled to a client computer. This computer is usually used to send queries to the entities executed on the application nodes. The design of a second network isolates the data stream between the application nodes and the data stream between the client computers and the application node. The volume of data interchanged on a network is thus reduced and at the same time the isolation increases security against spying or unauthorized access.

One particularly advantageous embodiment is the design of the entities stored in the memory device as part of a database. Alternatively, the stored entities are applications which access a database. In this context, the database is advantageously part of the memory device.

In another development of the invention, each data processing system has an associated identifier. Data processing systems in the cluster arrangement with the same identifier form a pool. Thus, it is a simple matter to divide a cluster arrangement further, wherein the systems with the same identifier are able to undertake individual tasks.

Another aspect of the invention is directed to a method in a cluster arrangement comprising at least two application nodes and an inspection node which are connected to a network. The inspection node receives from the application nodes a list with all the entities executed on the application nodes and with the data and parameters which are required for executing the entities. In addition, the inspection node checks the application nodes for failure at regular intervals of time and, if an application node has failed, compiles a list with the entities executed on the failed application node and with the data required for execution. This list is forwarded by the inspection node to application nodes connected to the network with a request for execution.

This method is used by the inspection node to check the application nodes merely for failure, in other words for their presence. Checking, inspection or monitoring of the entities executed on the application node is dispensed with. This significantly reduces the volume of data between application node and inspection node. In one development of the method, the application node sends a change notification or a new list to the inspection node in the event of a change of status of the entities executed on the node.

It is expedient when, if an application node has failed and this has been recorded by the monitoring function, the inspection node forwards the list compiled by the application node together with a request for execution to the at least one further application node. Alternatively, an application node compiles a list with an entity intended for execution and with the data required for execution and sends this list to the at least one further application node.

In another refinement, if an application node has failed then the inspection node ascertains a further application node using the list compiled by the application nodes and using settable parameters. The ascertained application node is sent a request for execution of the entities executed on the failed application node. This means that load balancing can be effectively performed for the entire cluster using the inspection node. In this connection, the inspection node sends a signal for terminating an entity to a first application node and a signal for executing the terminated entity to a second application node.

In particular, the compiled list and the settable parameters can be used to ascertain a suitable computer for executing prematurely terminated entities. It also makes sense if the inspection node ascertains the application nodes which are to be checked by evaluating the list received from the application nodes. In one refinement, the method is performed by an inspection agent executed on the inspection node and by an application agent executed on the application nodes.

DETAILED DESCRIPTION OF THE DRAWINGS

Figure 1:
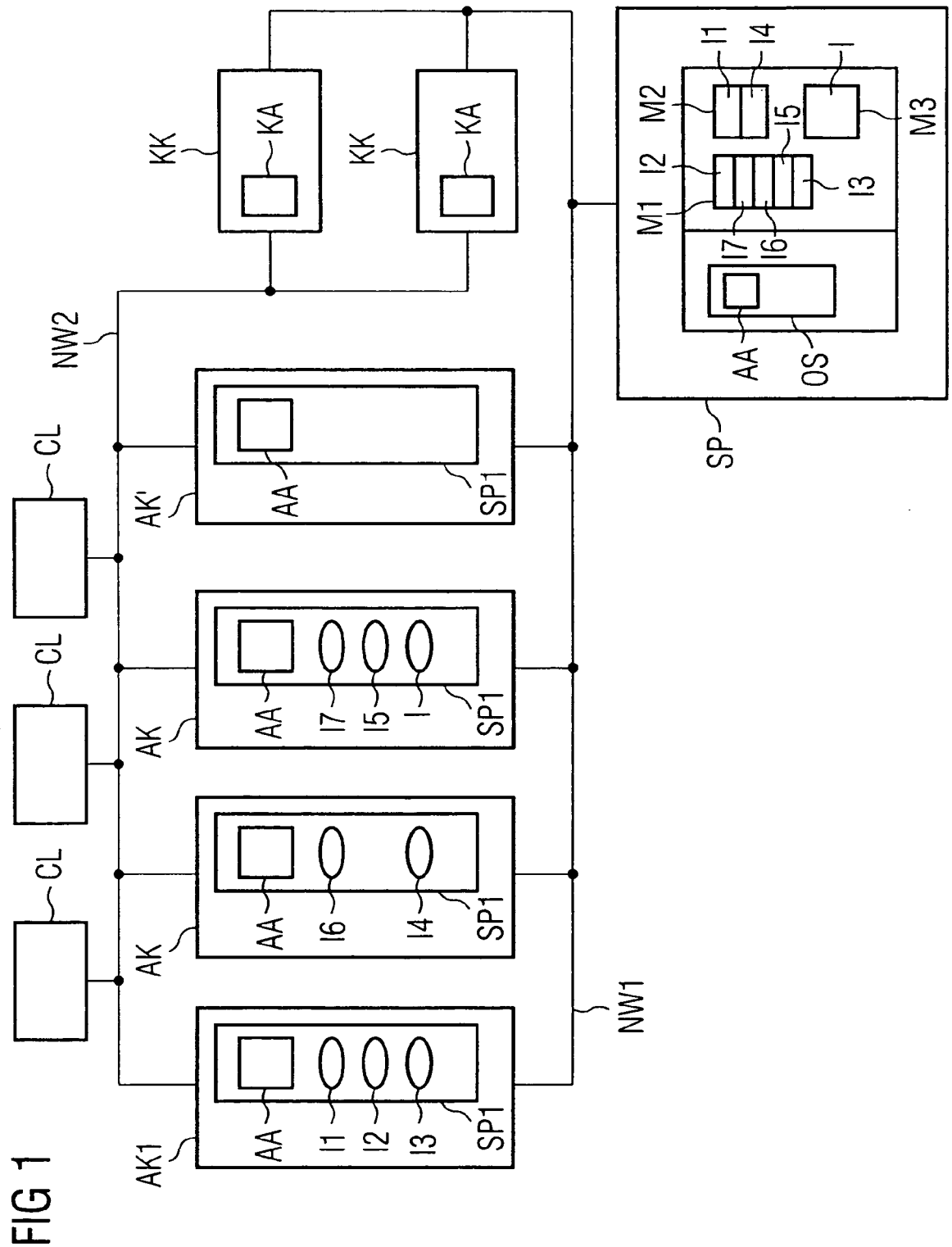
FIG. 1 shows a first exemplary embodiment of a cluster arrangement.

FIG. 1 shows an inventive cluster arrangement with six data processing systems. Four of these data processing systems, which are in the form of servers, form the application nodes AK1, AK, AK and AK'. The two further servers each form an inspection node KK. All the servers have a main processor and a main and/or hard disk memory SP1. The memory of each application or inspection node contains an operating system OS, such as Unix, Linux or Microsoft Windows. This has functions for controlling programs on the application node, functions for monitoring and maintaining operation and for accessing individual components of the node. The memories SP1 at the application nodes AK1, AK and AK' also each have an application agent AA, which is part of the operating system OS. The application agent AA is a special program running in the background (called demons; a printer driver is such a demon). Such programs are well known and can be readily developed by anyone with ordinary skill in the art. The memories at the inspection nodes KK contain an inspection agent KA. Inspection agent KA is also a demon-type special program that can be readily developed by anyone with ordinary skill in the art.

Each application node AK1, AK and AK' is connected to the inspection nodes KK and to a memory device SP via a first network NW1. This network allows data transfer among the application nodes AK1, AK and AK', among the application nodes AK1, AK, AK' and the inspection nodes KK, and also among the application nodes, the inspection nodes and a memory device SP. A second network NW2 connects the application nodes and the inspection nodes to client computers CL. The client computers are designed for queries which are sent to the application nodes for handling.

The memory device SP has the operating system OS for all the application nodes AK1, AK and AK'. The application agent AA at each application node is a service of this operating system OS and is started following initialization of the operating system. It is a demon operating in the background. In addition, the memory device SP contains a plurality of program modules M1, M2 and M3. These are larger applications which for their part can be divided into individual entities. Examples are 3D simulation software and databases such as SAP and Oracle. Thus, the module M1 contains five entities, the module M2 contains two entities and the module M3 comprises one entity I. An entity is a subprogram or routine which cannot be further divided and has to run on a single node.

The entities of the various modules are loaded into the memory SP1 at the application nodes AK1 and AK and are executed within memory SP1 of corresponding node AK. Thus, the application node AK1 executes the entity I1 from the module M2, and also the entities I2 and I3 from the module M1, the two application nodes AK execute the entities I4 to I7 and also the entity I. The application node AK' does not execute a further entity.

Figure 2:
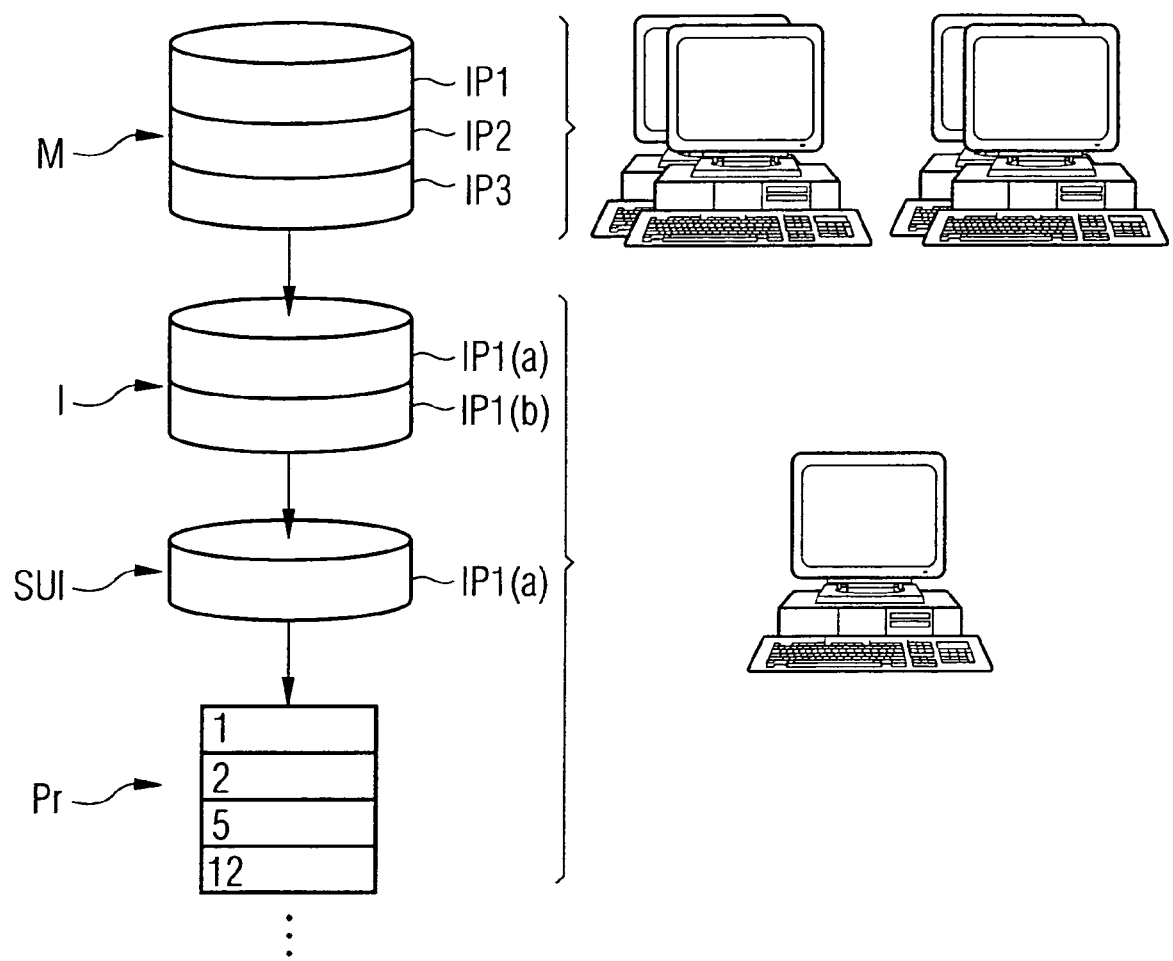
FIG. 2 shows a diagram to explain terms which are used.

The relationship between module and entity can be seen in FIG. 2. A module M is a larger application which is executed on a plurality of computers. To this end, the module M is divided into a plurality of smaller units called entities. The individual entities may communicate with one another and interchange data. This results in a dependency. For their part, the entities are divided into subentities SuI comprising individual processes Pr. An individual entity is executed together with its subentities Sul and processes Pr on a computer. In this case, a node can also execute a plurality of entities belonging to different modules or to the same module. By way of example, the module M2 with the entities I1 and I4 is distributed over the application nodes AK1 and AK. At the same time, the entities I2 and I3 of the module M1 run on the nodes AK1.

Each entity has an associated unique identifier IP1, IP2, IP3 which is assigned to the application node when the entity is executed on an application node. This unique identifier IP1, IP2, IP3 can be used to identify the application node on which the entity is being executed. It is therefore possible to change an entity from one application node to another without difficulty, because the identifier is deleted on the old application node and is assigned to the new one. The entity is accessed using the associated unique identifier. In the present exemplary embodiment, the unique identifier is defined by a virtual IP address. The application node AK1 thus receives the virtual IP address of the entity I1, I2 and I3. A client CL wishing to access the entity I1 via the network NW2 sends its query to the virtual IP address associated with the entity I1. The application node AK1 receives the query and forwards it to the entity I1, which processes it. The use of virtual addresses which are associated with an entity and are allocated to the application node when the entity is executed allows a free choice of application node.

Figure 3:
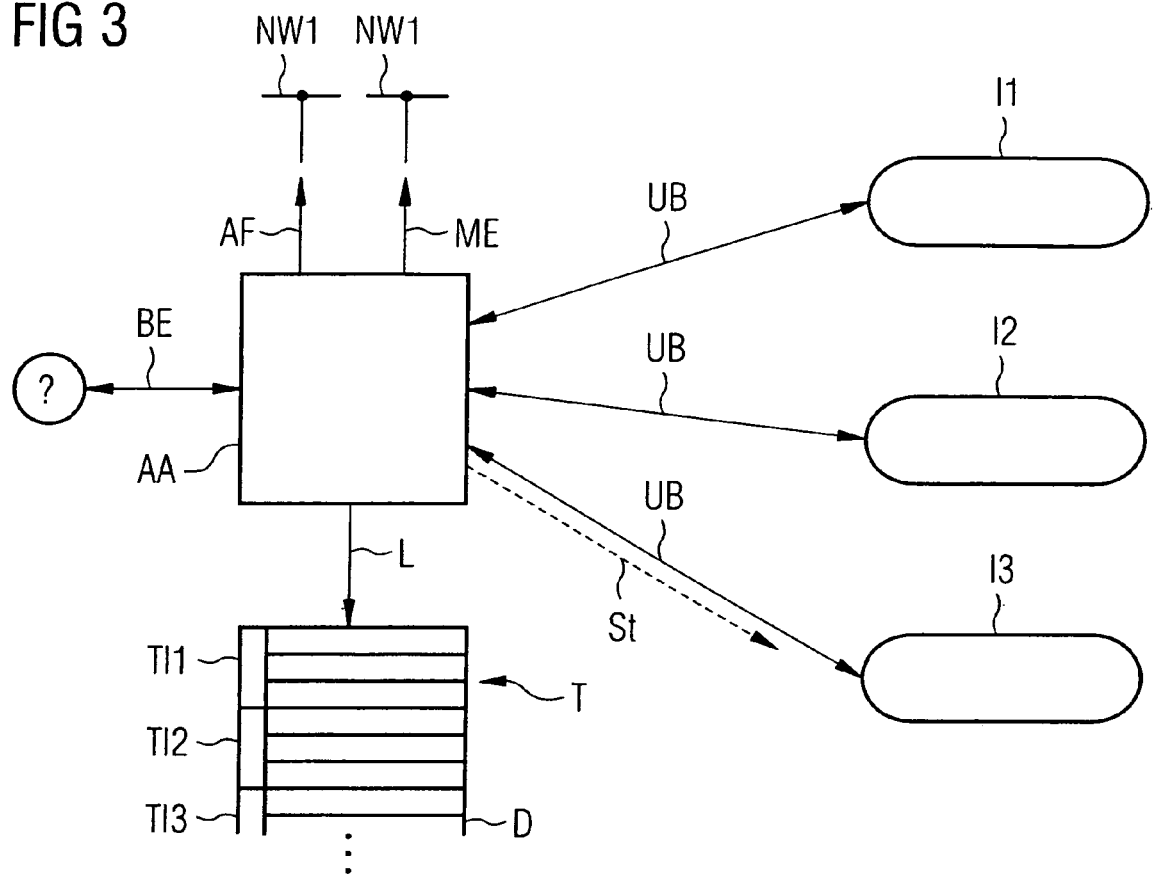
FIG. 3 shows a functional overview of the application agent.

The various functions of the application agent AA are explained in FIG. 3 using the example of the application node AK1. The entities I1, I2 and I3 are executed on this application node. The application agent AA has a monitoring means UB and uses this to monitor the entities. This includes, by way of example, measuring the processor utilization level of the memory which is being used up for each entity, queries processed and further operating parameters. The application agent AA also monitors the correct manner of operation and the availability of the entities I1 to I3. In addition, the application agent uses the monitoring means to check whether there are further entities to be monitored on the application node. The monitoring means is designed such that it identifies entities which need to be monitored. In addition, it identifies dependencies between entities which are executed on the application node. To this end, it evaluates a list of all the processes running on the node periodically, inter alia. A periodic check also identifies retrospectively started entities and includes them in the automatic monitoring. The monitoring means are part of the application agent AA and can be designed as sensors that are connected to the entities for monitoring the entities. The monitoring means can include a function that is adapted to inspect or trace an entity or a functionality of an entity.

It also has a function L for producing a list T, which is subsequently called a testament. This testament T comprises individual testament elements TI1 to TI3 which hold all the important data D for the individual entities I1 to I3 which are to be monitored. The data D held include not only the name of the entity but also the operating parameters which are required for correct operation of the entity. Examples of these are requisite memory and computation capacity, environmental variables, dependencies of the entities on one another, on other entities, and on operating parameters and the like. In addition, the testament contains data and parameters about the application node. By way of example, these are the type and nature of the server, name, location, memory and processor used. Evaluating these parameters of the testaments at all the application nodes allows the cluster structure to be determined and opens up further configuration opportunities.

If the monitoring function does not ascertain any entities which are to be monitored then the agent recognizes that the application node is available for executing new entities and flags this in the testament accordingly.

The application agent AA includes a start function ST. It calls upon this start function which loads the entity to be executed from the memory device SP via the network NW1, and executes said entity. The executed entity is checked periodically by the monitoring means UB.

An assessment and decision function BE is used by the application agent AA to evaluate whether a new entity can be executed. Besides measurement of the operating parameters of the application node, for example processor and recollection utilization level, and of an internal memory (where the testament T is part of this recollection), the decision about starting a new entity is dependent on defined rules. If the prerequisites are met, the application agent AA loads the entity and executes it.

Examples of defined rules are the provision of a minimum reserve for the processor power and the memory, for example. Another rule is the definition that certain entities are executed only during a defined time period. Yet another rule states that when a new entity is started it is checked for dependencies using the monitoring function, and any entities which are dependent on the entity and have not been started to date are likewise executed.

After a new entity has been started, the application agent sends a report ME via the network NW1 to the other application agents at further application nodes. By doing this, it indicates the successful execution of a restarted entity.

Through its monitoring means UB for the individual entities I1, I2 and I3, the application agent is able to identify unwanted premature termination of the monitored entity I3. To continue to maintain correct operation, it has a function for terminating the erroneous entity I3 and for restarting. If a restart is not successful, the agent produces the testament element TI3 of the erroneous entity I3 from the testament T and sends a request AF for starting this entity with the testament element TI3 to the further application nodes via the network NW1. It can then terminate the erroneous entity I3 or exclude it from further starting attempts.

In addition, it has a function for terminating an entity which is being executed on the application node. This function is used to terminate an entity following a request. This allows entities to be terminated on one application node and to be re-executed on another.

The largely autonomous and independent decision-making of the application agents AA in the application nodes AK means that there is no longer any need for continuous inspection and monitoring of the individual entities on the application nodes AK by the inspection nodes or centrally operating monitoring means.

Figure 4:
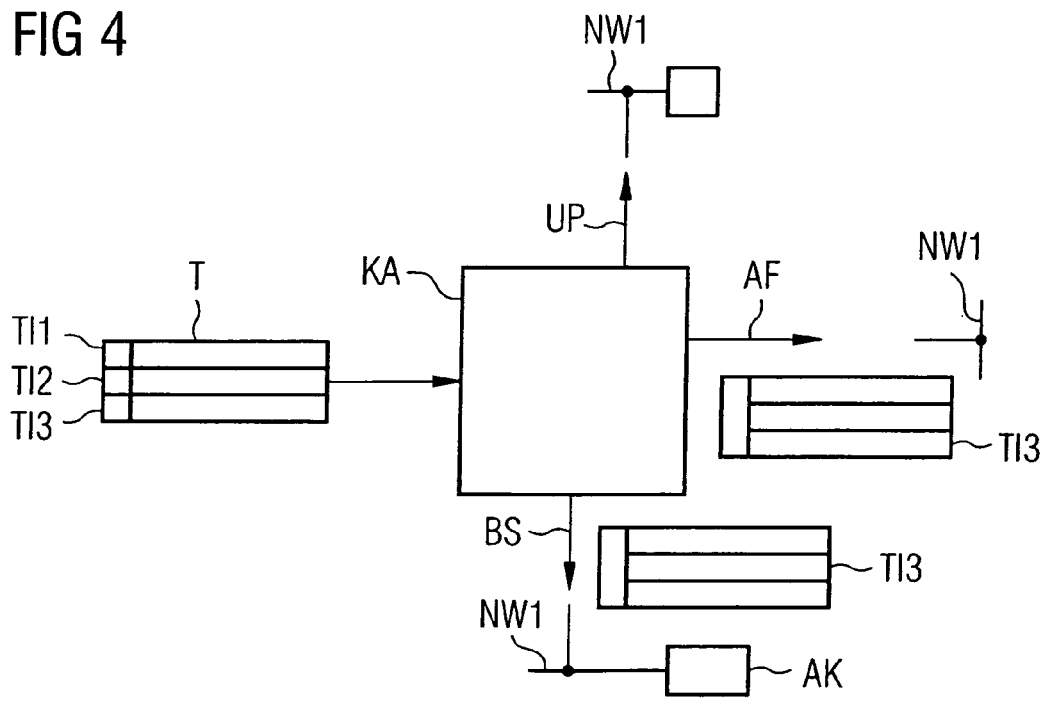
FIG. 4 shows a functional overview of the inspection agent.

An overview of the functions of the inspection agent KA is shown in FIG. 4. The inspection agent KA receives the respective testament from the application agents AA and manages these. This causes the application agents to register in the cluster. From the testaments T of the application agents AA, the inspection agent produces a list containing all the application nodes AK situated in the cluster, including their hardware information and operating parameters. As a result, the inspection agent independently receives an up-to-date configuration of the cluster and also registers dynamic changes. Furthermore, the inspection agent KA is provided with a means UP for checking the operability and the presence of all the application nodes AK via the network NW1. The operability and presence of an application node AK is communicated by virtue of a simple presence signal being sent by the application agent. By way of example, the inspection agent KA can send a ping signal to the individual application nodes AK via the network NW1.

If an application node has failed, which is indicated by an absence of a response to a function test, the inspection agent KA evaluates the testament for the associated application nodes AK and extracts testament elements TI3 therefrom. These testament elements are routed to the network NW1 and to the remaining application nodes AK together with a request AF for execution of this entity. Alternatively, the inspection agent KA has a function for determining an application node for executing an entity. Since the application node AK' in the cluster arrangement shown in FIG. 1 does not have an entity, the inspection node KA selects this application node AK' for executing the entities I1, I2 and I3 following failure of the application node AK1. The testament T transmitted by the application agent AA at the application node AK1 allows the failed entities to be started on the application node AK'.

Figure 5:
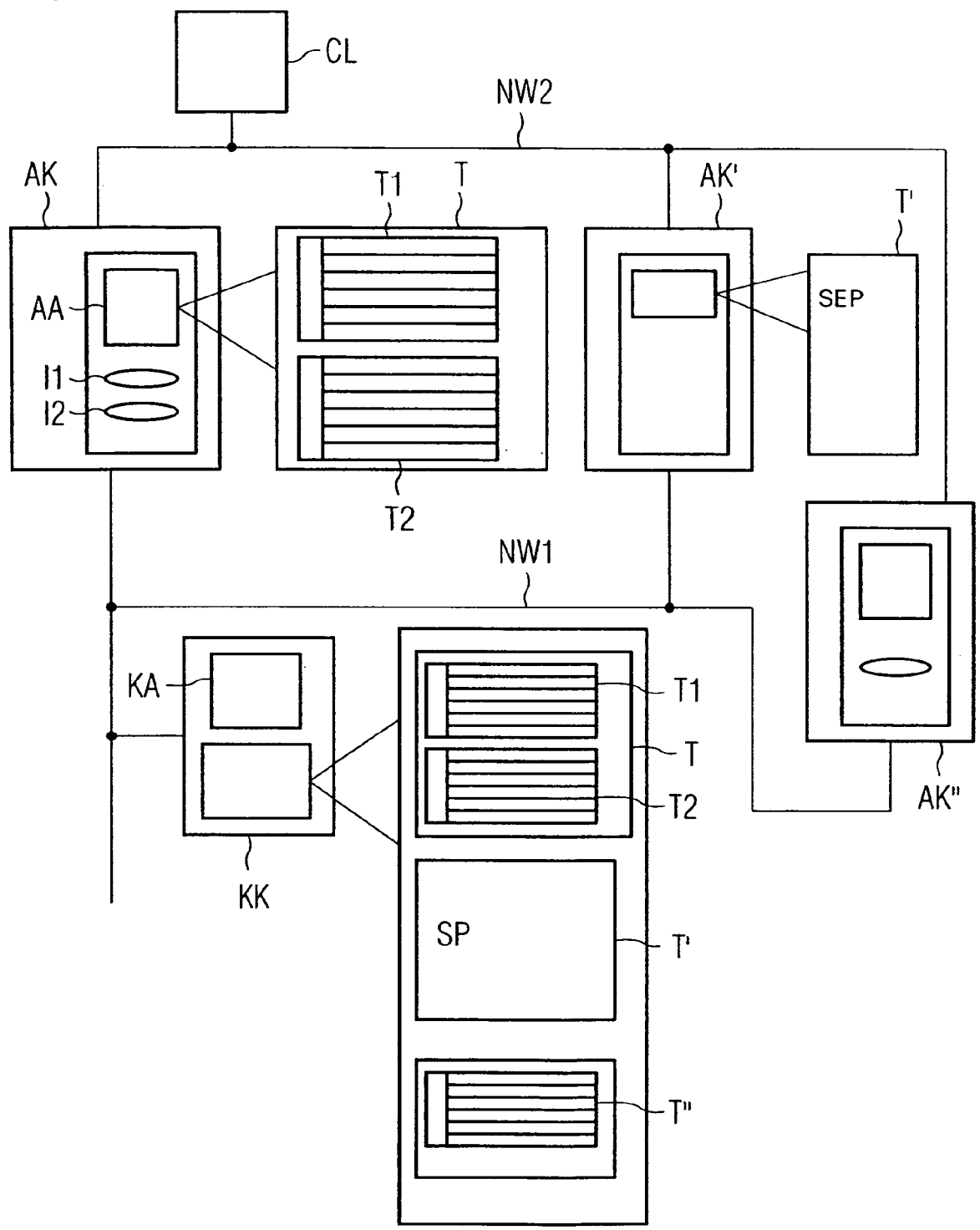
FIG. 5 shows a detail from the inventive arrangement shown in FIG. 1.

FIG. 5 shows a detail from the inventive cluster arrangement to which a new application node AK" is added. Two entities I1 and I2 are executed on an application node AK. No entity is executed on the application node AK'. The application agent AA at the application node AK has compiled a testament T with the two testament elements T1 and T2 and has transmitted it to the inspection node KK and to the inspection agent KA. The application agent at the node AK' transmits an empty testament T' to the inspection agent KA and uses an entry SEP in its testament T' to indicate that the application node AK' is ready to start an entity. The entry flags the node AK' as a free node.

The inspection agent KA for its part manages a list with the testaments T and T' at the application nodes AK and AK' and checks the nodes for presence by virtue of the agent KA periodically requesting a status signal from the application agents AA at the nodes. In the event of a change in the operating parameters of a monitored entity I on an application node AK, termination or starting of a new entity, this change is automatically transmitted from the respective application agent AA to the inspection agent KA at the inspection node KK. Hence, the list of the inspection agent KA always contains the up-to-date value of the testaments at the application nodes AK. In addition, said inspection agent receives information about the hardware parameters of the application nodes.

A new application node AK" is now connected to the network NW1. Following an initialization phase, the application agent AA on the node AK" starts. The monitoring function UB of the agent AA checks the processes, entities and applications executed on the application node AK" and automatically identifies the entity I3 which is to be monitored by the application agent AA. Together with operating parameters of the application node, the agent produces therefrom the testament T" with a testament element which contains all the data and parameters which are required for operation of the entity I3. The testament T" produced at the application node AK" is transmitted to the inspection agent KA. As a result, the application agent registers in the cluster and indicates that an entity is being executed on the application node AK" and is being monitored. The inspection agent KA now checks the presence of the application nodes AK, AK' and AK" in line with the testaments provided in its list.

If the application node AK" is isolated from the network NW1 or is prematurely disconnected, for example as a result of a power failure, then a check on the presence returns a negative result. The inspection agent KA sends the testament T" with a request for execution of the entities situated in the testament to the application nodes AK and AK'. The application agents AA receive the testament and use their measurement, their recollection and the external parameters to make a decision regarding whether the whole testament or testament elements can be executed on the application node.

The application agent at the application node AK' makes a positive decision and accepts the whole testament T". The agent restarts the entity I3 in line with the parameters prescribed in a testament on its node and transmits a new testament T' to the inspection agent, which now contains a testament element for the new entity I3. The entry SP is dispensed with.

Figure 6:
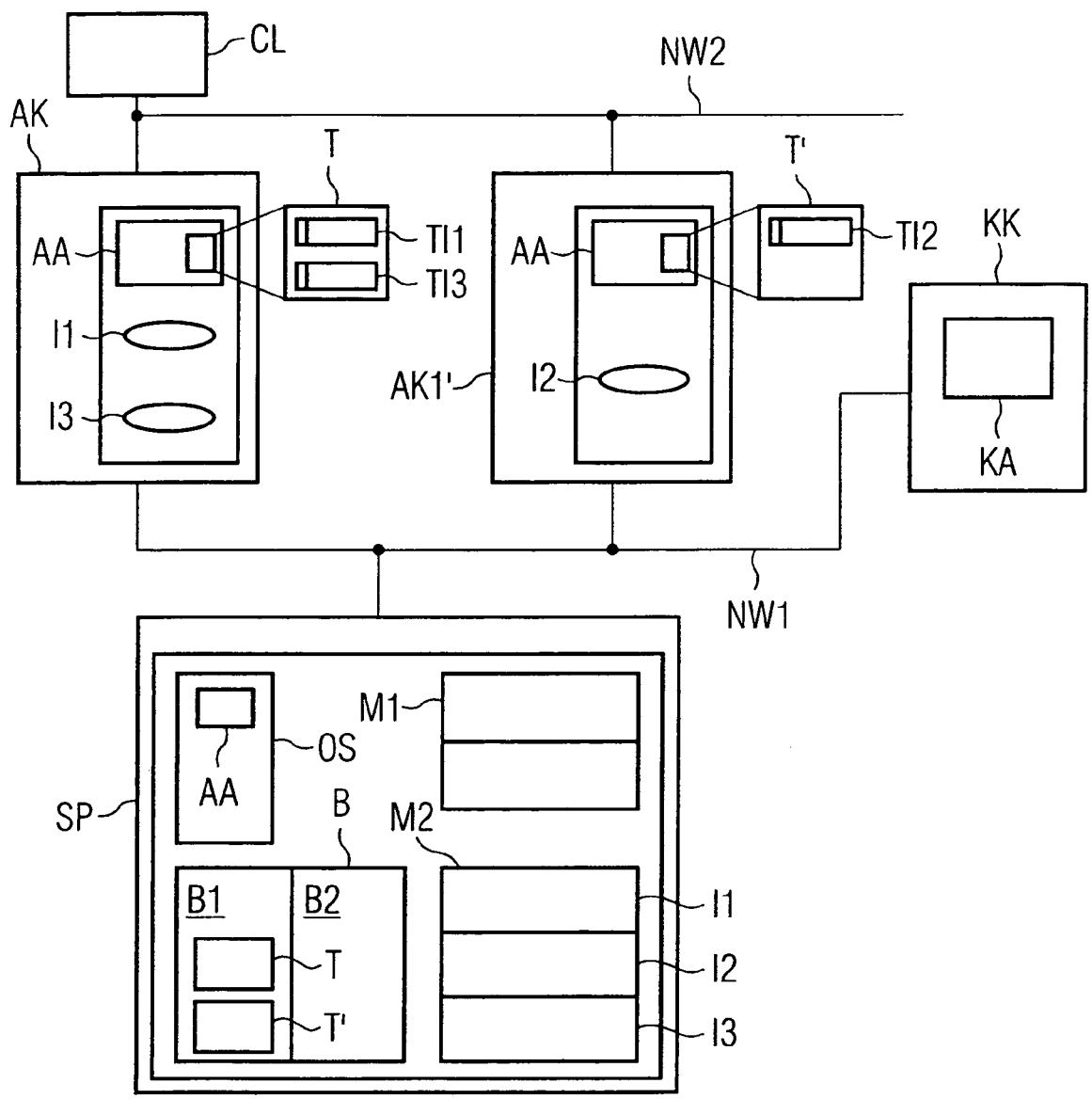
FIG. 6 shows an exemplary embodiment of a manner of operation of an application agent and an inspection agent.

A further expedient refinement is shown in FIG. 6. The cluster arrangement has two application nodes AK and AK1', and also a memory device SP and an inspection node KK, which are connected to one another via a network NW1. The nodes communicate with one another and with the memory device SP using the TCP/IP protocol.

The executed entities I1, I3 and I2 monitored by the application agents form the module M2, which is held in the memory device SP. In addition, the memory device SP contains the module M1, and also the operating system OS, jointly used by the application nodes, with the application agent AA. The memory device SP has an area B which is divided into two subareas B1 and B2.

The area B is designed to be able to be read and written to by all the application agents AA and the inspection agent KA. The application agents store the testaments of their application nodes in the subarea B1 in the memory device SP. In the event of a change on one application node, the application agent at this node produces a new testament and replaces the earlier testament with it in the area B1. The inspection agent at the inspection node evaluates the testaments in the area B1 and thus produces a list of the application nodes which are to be monitored by it.

The application agents at each node also periodically evaluate the area B2 of the memory device. The area B2 holds requests for execution of an entity. In this form, a request is made by storing a testament or a testament element in the area B2. The application agents read the testament or testament element held in the area B2 and make their autonomous decision about execution. If an application node is able to accept the testament, it deletes the testament from the area B2 and starts the indicated entity. The request or the report following an acceptance is made in a simple manner by storing a testament in the area B2 or deleting a testament from the area. A rejection of the request automatically appears by virtue of the testament remaining in the area B2.

An application agent terminating an entity stores the testament in the area B2, so that another application node can accept it. If an application node fails completely, with the application agent being unable to indicate this beforehand by storing its testament in the area B2, the inspection agent moves the testament of the failed application node to the area B2. The application agents at the other nodes then for their part make a decision. In this way, a high level of flexibility is achieved. By dividing a testament into a plurality of testament elements, the entities of a failed application node can be distributed over a plurality of nodes. The autonomy of the application agents and the jointly used memory in the device SP ensure correct operation even if the inspection node KK has failed.

Besides the examples presented here, it is also possible to find a large number of other embodiments. Particularly the rules for decision-making by the application agents, the functions and tasks of the inspection and application agents and the parameters in the testaments can be extended.

A further aspect of the invention relates to the grouping of individual data processing systems within the cluster arrangement to form a "virtual cluster". In this case, some data processing systems within the cluster arrangement are allocated an identification and these are thus combined to form a pool. In this context, the term "virtual" denotes merely a logical association, determined by a rule, of various data processing systems with one another. Pool formation within a cluster arrangement having a plurality of data processing systems is advantageous particularly when the widest variety of applications need to be kept highly available. It is thus expedient to provide some data processing systems specifically for execution of a database service, while other data processing systems from the same physical cluster are provided for a web application.

In this case, pool formation is effected according to generic rules. These may be dependent on the to the highly available application, for example, but also may comprise pure hardware parameters, for example. In addition, pool formation within a physical cluster allows individual pools to be allocated to various user groups. The applications started by the respective user group are then executed and kept highly available only on the data processing systems which are associated with the respective pool. Such a pool comprising a plurality of data processing systems which are associated with one another is also called a virtual cluster within the physical cluster arrangement.

Figure 7:
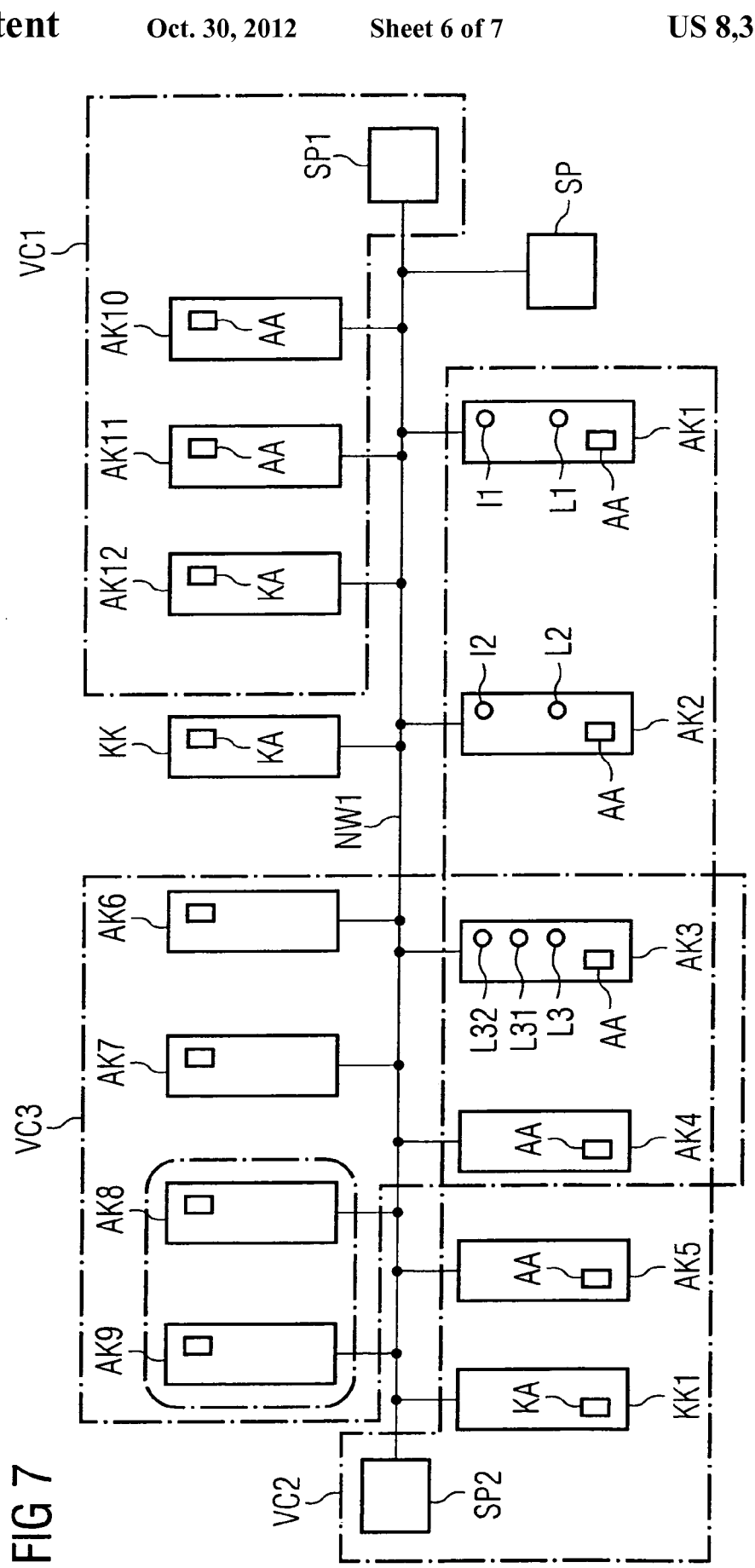
FIG. 7 shows a second exemplary embodiment of a cluster arrangement with pool formation.

One embodiment of a cluster arrangement with a plurality of virtual clusters or pools contained therein is shown in FIG. 7. The cluster shown in this figure contains a plurality of memory devices SP, SP1 and SP2 which are connected to a plurality of data processing systems via a common network NW1. In this case, these data processing systems are respectively equipped as computers with a main processor and a main memory. Twelve of these data processing systems are in the form of application nodes AK1 to AK12. Two further data processing systems form the inspection nodes KK and KK1. A respective application agent AA is executed on each of the application nodes AK1 to AK12. The inspection nodes KK and KK1 contain a respective inspection agent KA.

In this exemplary embodiment, the physical cluster arrangement comprises 3 virtual clusters VC1, VC2 and VC3. The virtual cluster VC1 contains the three application nodes AK10, AK11 and AK12 and also the memory device SP1. The virtual cluster VC2 comprises the application nodes AK1 to AK5, the inspection node KK1 and also the memory device SP2. The application nodes AK3 and AK4, together with the application nodes AK6 to AK9, are also associated with the virtual cluster VC3. The inspection node KK and also the memory device SP are not part of a virtual cluster in this exemplary embodiment.

The association between the individual application nodes AK or inspection nodes KK and the respective pools of a virtual cluster is made using generic rules. These rules may in part be prescribed by an external user, prescribed by the inspection agent KA at an inspection node KK or may result from the testaments of the individual application agents on the application nodes AK. To identify the individual virtual clusters and to associate individual nodes of the physical cluster with a pool, the part of an IP address or an IP address itself is preferably used. By way of example, the application nodes AK10, AK11 and AK12 of the virtual cluster VC1 are allocated IP addresses which match each other in one part. Nodes in the physical cluster arrangement whose IP address has the same part thus belong to the same pool or virtual cluster. Messages from or to nodes in this virtual cluster likewise contain this identification. Through appropriate evaluation of the agents on the data processing systems, messages with a different identification are ignored.

On the application node AK1 of the virtual cluster VC2, the application agent AA and also the entity L1 and entity I1 are executed. The application node AK2 contains the entities L2 and I2. The entities I1 at the application node AK1 and the entity I2 at the application node AK2 together form an application. This joint application is kept highly available on the various application nodes AK1 to AK5 of the virtual cluster VC2. A request to start one of the two entities I1 or I2 for the whole application I is therefore accepted only if the corresponding application node is associated with the virtual cluster VC2.

Besides its application agent AA, the application node AK3 also comprises the entity element L3 and also the entities L31 and L32, which are each executed with a high level of availability. Together with the entities L2 and L1 at the application nodes AK2 and AK1, the entity L3 forms a further application of the virtual cluster VC2. The application nodes AK4 and AK5 are reserve nodes on which no further entity of the virtual node VC2 is executed.

In addition, the application nodes AK3 and AK4 are also part of the virtual cluster VC3. To evaluate requests and to send requests for starting an entity, it is therefore necessary for the application agents AA on the application nodes AK3 and AK4 to send an appropriate request always to the application agents at a node which belongs to the same pool. To this end, the application agent AA on the node AK3, for example, contains a testament ready which has been extended by the functionality of a unique association between the individual entities and the virtual cluster.

Figure 9:
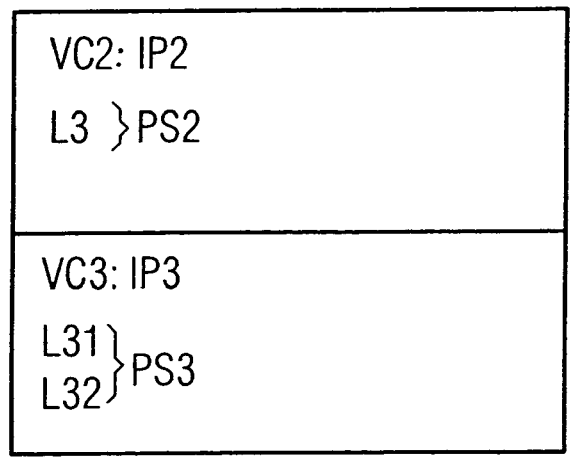
FIG. 9 shows a schematic detail from a testament managed by an application agent.

A detail from this testament can be seen in FIG. 9. In this case, the testament is divided into two larger subareas which each contain the applications of the two pools, of which the node AK3 is a part. These are the pools or virtual clusters VC2 and VC3. The virtual cluster VC2 comprises an identification number IP2 which allows a unique association with the virtual cluster. In addition, the entity L3 on the virtual cluster VC3 is executed. For all the messages which relate to the entity L3, the association IP1 is thus also sent. Agents whose nodes do not have the same association are not part of this virtual cluster and thus ignore the message.

The second subarea comprises all the testament elements for the entities executed on the node which need to be associated with the virtual cluster VC3. The pool VC3 has the identification IP3. Within this subarea of the testament, the application agent AA thus manages the testament elements for the entities L31 and L32. The respective testament elements L31 and L32 contain, besides the parameters for executing these testament elements, also an association with the virtual cluster VC3. If one of the entities has failed and reinitialization of the failed entity has failed, the application agent AA at the node AK3 produces the testament element with the association identifier for the virtual cluster on which this entity is executed. If the entity L31 or L32 has failed, a testament element is produced which is associated with the virtual cluster VC3 by the identification IP3, and if the entity L3 has failed then an appropriate testament element with the association identification IP2 is produced.

The agent AA then sends the application nodes a request for execution of this entity. The respective application agents on the application nodes evaluate this request and first of all check whether they are part of the virtual cluster with the same identifier. If they are not part of the virtual cluster on which the entity is intended to be executed, the request for execution is ignored. Otherwise, a check is performed to determine whether the resources required for this purpose are available for execution.

The pool VC2 additionally has an associated inspection node KK1 with an inspection agent KA in order to increase the availability and the failure immunity. To this end, the application agents AA on the application nodes AK1 to AK5 produce their testament elements and store them in a common readable and writeable memory area on the mass memory SP2. The inspection agent KA on the inspection node KK1 monitors the operability of the individual application nodes AK1 and their agents AA by means of status reports sent at regular intervals of time.

Figure 8:
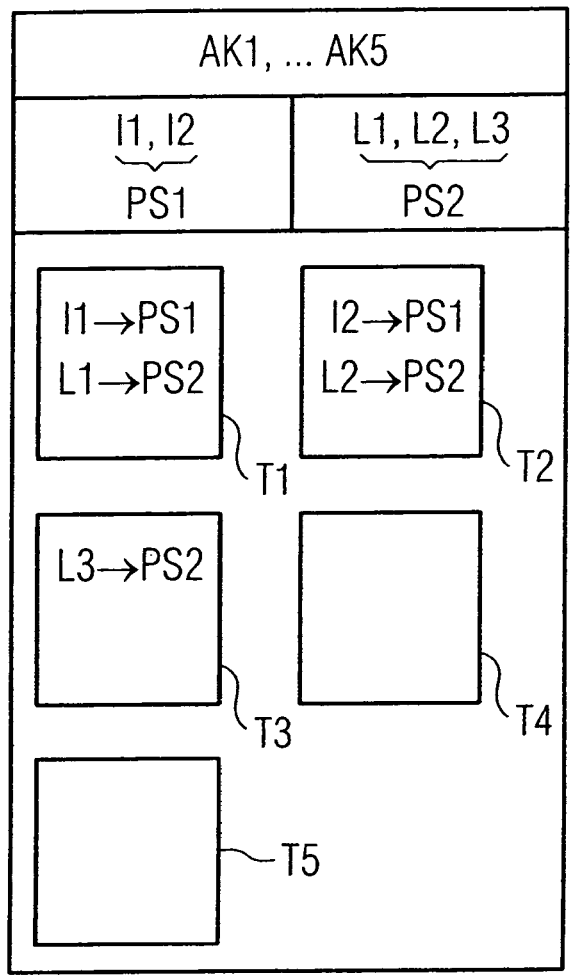
FIG. 8 shows a schematic detail from a readable and writeable memory area.

A schematic illustration of this memory area and of the individual transmitted testament elements from the application agents on the application nodes AK1 to AK5 is shown in FIG. 8. Thus, an overall list holds, inter alia, an indication of which application node AK is associated with the virtual cluster VC2. In addition, a list containing applications which are currently being executed on the virtual cluster VC2 is created. Specifically, these are the applications with the entity elements I1 and I2 and also the application with the entity elements L1, L2 and L3. Each of these applications has an associated priority. The respective entity elements inherit this priority. The priority indicates the importance of the individual applications executed on the virtual cluster VC2. They thus form an order or rank for the executed applications.

In the example, the application with the two entity elements I1 and I2 has the priority index PS1 and the application with the entity elements L1, L2 and L3 has the priority index PS2. In this case, the priority index PS2 is a smaller number than the index PS1, and the application with the entity elements L1, L2 and L3 is thus less important than the application with the entity elements I1 and I2.

In addition, the memory area in the memory SP2 contains the testaments T1 to T5 of the individual application nodes AK1 to AK5. These respectively contain the testament elements for the entity elements running on the respective application node AK1 to AK5. The testaments T4 and T5 of the application nodes AK4 and AK5 are empty.

The inspection agent KA at the inspection node KK regularly monitors the high availability of the individual application nodes. If the application node AK1, for example, now fails completely then the entity elements I1 and L1 are no longer executed either. The inspection agent KA on the inspection node KK now produces two testament elements for the entity elements I1 and L1 from the testament T1. In that case, the higher priority index means that the testament element with the entity I1 is sent together with a request for execution of this entity element to the individual application nodes within the physical cluster via the network. Within this testament element, there is also an indication of which virtual cluster has the associated entity I1 which is to be executed.

The application agents AA on the application nodes AK which are not associated with the virtual cluster VC2 ignore the request for execution. By contrast, the agents AA on the application nodes AK2 to AK5 check their resources. One of the application agents AA possibly accepts the testament element and executes the entity I1 on its node. When the entity element I1 has started, an appropriate report is returned to the inspection agent KA. Only when the entity element I1 together with the testament element have been accepted by one of the application agents AA within the virtual cluster and have been successfully executed does the inspection agent KA send the testament element with the entity element L2 together with a request for execution.

This prioritization of the individual applications or entities means that applications with high priorities are always kept highly available. Only if sufficient capacity is available are entities with lower priority also re-executed. In this exemplary embodiment, the inspection agent KA on the inspection node KK1 within the virtual cluster VC2 undertakes production of the testament elements and the request for execution of the entity elements.

If failure of the application node AK3 is foreseeable, the application agent AA at the node AK3 records this. The agent AA at the node produces a testament element with the entity element L3 and a request for execution and sends said testament element to the application nodes in the physical and virtual cluster arrangements. In addition, the application agent AA on the application node AK3 produces two testament elements with the entity elements L31 and L32, which the application agent likewise sends to the cluster arrangement with a request for execution. However, the entity elements L31 and L32 are associated with the virtual cluster VC3 and are ignored by the application nodes AK1, AK2 and AK5. With suitably free resources, however, the application nodes AK4 or AK6 to AK9 can accept the entity elements L31 and L32.

In these exemplary embodiments, the reports are sent to all the application nodes within the physical cluster arrangement. However, they are handled only if the report comes from a node in the same pool. In an extension, it is also possible to send reports only to nodes within the same virtual cluster. Hence, although the volume of data is reduced, the flexibility is also restricted.

It is also expedient to ensure that an entity with low priority which is terminated on an application node unplanned is not able to prompt the application agent to restart the entire application node if an entity with higher priority is still being executed correctly on said application node. By way of example, if the entity element L2 has failed, the application agent AA on the application node AK2 cannot completely restart the entire application node AK2 if the entity element I2 with higher priority is still being executed correctly. To restart, the application agent AA therefore needs to send a testament element with the entity element I2 and the request for execution to the application nodes in the virtual cluster VC2. Upon confirmation of an acceptance and the successful execution of this entity element, the application agent AA on the application node AK2 can then initialize a complete restart for the application node AK2.

This association with individual virtual clusters using an IP address element allows a very dynamic and flexible reaction to possible alterations in the resource requests. In addition, it is also possible within a virtual cluster to provide further group formation or pool formation between individual data processing systems. In the case of the virtual cluster VC3, for example, the application nodes AK8 and AK9 form a further group within the virtual cluster. This group formation can also be controlled using generic rules. In addition, a further inspection node KK with an inspection agent KA may be provided which monitors the full cluster structure and inspects the individual data processing systems for presence at regular intervals. If further data processing systems are added to the physical cluster, this inspection node can associate the added data processing systems with various virtual clusters so as to increase the virtual capacity thereof. The introduction of pool formation through association of an identification and the prioritization of individual entity elements within a pool allow very fine gradation and selection control within a physical cluster arrangement. In this context, the individual application nodes and the pools within a physical cluster arrangement can be configured largely independently. Additional administrative tasks are largely dispensed with.

All in all, significantly less data interchange between inspection node and application node is thus achieved with simultaneously maximum flexibility. It is even possible to dispense with an inspection node completely as a result of the autonomy of the individual application nodes. The inspection, control and monitoring of the cycles on the nodes are the responsibility of the application agents, which have no direct communication with one another. The design of the application agent allows independent identification and monitoring of entities. This dispenses with complex configuration and, in particular, there is no need for precise knowledge of the cluster structure, since this is generated independently. Particularly when clusters which frequently change their number of nodes are used, this concept of autonomous monitoring gives rise to a high level of flexibility.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. A cluster arrangement of a system, comprising:
   a first network;
   a plurality of data processing systems, each of said plural data processing systems forming an application node and having an operating system which is the operating system in each of said plural data processing systems, each said application node including an entity which is executed;
   an inspection node connected to the first network, the inspection node including the operating system and an inspection agent configured to manage reports received from each application node; and
   an application agent on the each application node, the application node comprising a service of the operating system and being started following initialization of the operating system on the each application node, the application agent being configured to:
   monitor and identify entities executed on the each application node;
   start a new entity or restart an executed entity which has been terminated prematurely on the each application node;
   assess and decide whether the new or restarted entity can be executed on the each application node;
   forward a request to execute the new or restarted entity to the application agents at all of the application nodes connected to the first network;
   report to the application agents at all of the application nodes connected to the network following an acceptance of the request to execute the new or restarted entity; and
   report to the application agents at all of the application nodes connected to the network if an application agent rejects the request to execute the new or restarted entity.

2. The cluster arrangement of the system as claimed in claim 1, wherein the application agent on each application node is monitored to compile a list which respectively contains the entities executed on the each application node and all data required to execute the new or restarted executed entity as list element.

3. The cluster arrangement of the system as claimed in claim 2, wherein the list includes information about the each application node.

4. The cluster arrangement of the system as claimed in claim 2, wherein the execution request comprises a compiled list element from the each application agent.

5. The cluster arrangement of the system as claimed in claim 1, wherein monitoring the application agent comprises identifying dependencies of the entities executed on the application node on at least one of other entities and parameters.

6. The cluster arrangement of the system as claimed in claim 1, wherein the application agent includes a function which is configured to identify an unsafe operating state of the entity executed on the application node.

7. The cluster arrangement of the system as claimed in claim 1, wherein the application agent includes a function which terminates the entity executed on the application node.

8. The cluster arrangement of the system as claimed in claim 1, wherein a memory device is connected to the first network and the entity which is executed on an application node.

9. The cluster arrangement of the system as claimed in claim 8, wherein the memory device stores an application node operating system.

10. The cluster arrangement of the system as claimed in claim 1, wherein the application agent at each application node comprises a service of the operating system running on the each application node.

11. The cluster arrangement of the system as claimed in claim 1, wherein the inspection agent is configured to:
    check operability of the application nodes which are connected to the first network;
    forward the request to execute the new or restarted entity to the application agents at the application nodes connected to the network; and
    determine whether an application node is located within the cluster arrangement and place the request to execute the new or restarted entity at this application node if it is located within the cluster arrangement.

12. The cluster arrangement of the system as claimed in claim 11, wherein said inspection agent being configured to use lists compiled by the application agents at the application nodes to determine which of the application nodes to check.

13. The cluster arrangement of the system as claimed in claim 1, wherein at least one of a compiled list, the execution request and the report is stored as a file in a memory device.

14. The cluster arrangement of the system as claimed in claim 1, wherein each entity stored in a memory device includes a unique identifier which is allocated to the each application node where the entity is executed.

15. The cluster arrangement of the system as claimed in claim 1, wherein the first network is configured to communicate using Transmission Control Protocol Internet Protocol (TCP/IP) or Network File System (NFS) protocol.

16. The cluster arrangement of the system as claimed in claim 1, wherein the inspection node includes means configured to control an initialization operation at the application nodes, the initialization operation comprising a command to load an operating system from a memory device to the each application node.

17. The cluster arrangement of the system as claimed in claim 1, wherein a plurality of application nodes are connected to a second network which is connected to a client computer.

18. The cluster arrangement of the system as claimed in claim 1, wherein entities stored in a memory device include a database.

19. The cluster arrangement of the system as claimed in claim 1, wherein a data processing system of said plural data processing systems includes an associated identifier.

20. The cluster arrangement of the system as claimed in claim 19, wherein each of said plural data processing systems in the cluster arrangement of the system having the same identifier from a pool.

21. The cluster arrangement of the system as claimed in claim 19, wherein the application agent at an application node is configured to:
- evaluate the identifier associated with the each application node;
- forward the request to execute the new or restarted entity to the application agents on the application nodes having the same identifier; and
- report to application agents on the application nodes having the same identifier following acceptance of the request to execute the new or restarted entity.

22. The cluster arrangement of the system as claimed in claim 19, wherein the identifier comprises an IP address or part of an IP address.

23. The cluster arrangement of the system as claimed in claim 19, wherein each of said plural data processing systems defines the inspection node which includes an associated identifier and the inspection agent executed on the inspection node is configured to check a function of the application nodes having the same identifier.

24. The cluster arrangement of the system as claimed in claim 19, wherein the entity executed on each application node includes an associated priority and the application agent is configured to evaluate the priority of the following functions: assessment, decision, and the request to execute the new or restarted entity.

25. The cluster arrangement of the system as claimed in claim 19, wherein the inspection agent at the inspection node is configured to evaluate a priority of the entity executed on each application node upon assessing, deciding and forwarding the request to execute this entity.

26. The cluster arrangement of the system as claimed in claim 1, wherein the application agent is further configured to one of (i) identify the premature termination of a monitored entity and (ii) continue to maintain correct operation by terminating an erroneous entity, and terminate the entity being executed on the application node.

27. A method in a cluster arrangement comprising a plurality of application nodes and an inspection node including a device for controlling an initialization operation at each of said plurality of application nodes, each of said plurality of application nodes and the inspection node being connected to a network, the method comprising the steps of:
- receiving at the inspection node from each of said plurality of application nodes a first list including all entities executed on the each of said plurality of application nodes and data required to execute the entities, the initialization operation including a command for loading the operating system of the application node to each of said plurality of application nodes;
- checking with the inspection node, at regular intervals of time, to determine whether any of said plurality of application nodes has failed;
- if any of said plurality of application nodes has failed, compiling with the inspection node a second list of entities executed on the failed application node and the data required to execute the entities executed on the failed application node, and forwarding the second list to all of said plurality of application nodes connected to the network with a request to execute the entities on the forwarded second list;
- assessing and deciding, at each of said plurality of application nodes, whether to start a new entity or restart a failed entity upon receipt of the request to execute an entity on the forwarded second list; and
- reporting to application agents at all of said plurality of application nodes if an application agent rejects the request to execute the entity on the forwarded second list.

28. The method as claimed in claim 27, further comprising:
- forwarding the compiled second list of entities executed on the failed application node together with the execution request to at least one additional application node if any of said plural application nodes has failed.

29. The method as claimed in claim 27, wherein an application node compiles the first list including all the entities executed on the each of said plural application nodes and sends the execution request with the compiled first list to at least one additional application node.

30. The method as claimed in claim 27, wherein if any of said plural application nodes has failed, the inspection node ascertains an additional application node using the first lists and settable parameters, and the inspection node transmits the request to execute the entities executed on the failed application node to said additional application node.

31. The method as claimed in claim 27, wherein the inspection node ascertains which of said plural application nodes are to be checked by evaluating the first lists received from the plural application agents.

32. The method as claimed in claim 27, wherein the method is performed by an inspection agent executed on the inspection node and an application agent executed on each of the application nodes.

33. The method as claimed in claim 27, further comprising:
- allocating an identifier to each of said plurality of application nodes and the inspection node;
- wherein the inspection agent at the inspection node receives a report from an application agent of each of said plurality of application nodes having the same identifier.

34. The method as claimed in claim 27, further comprising:
- allocating a priority to an executed entity; and
- formatting, at an inspection agent, a priority associated with the entity executed on the failed application node and sending the execution request based on the priority if any of said plurality of application nodes has failed.

* * * * *

UNITED STATES PATENT AND TRADEMARK OFFICE
CERTIFICATE OF CORRECTION

PATENT NO. : 8,301,599 B2  
APPLICATION NO. : 11/312209  
DATED : October 30, 2012  
INVENTOR(S) : Bernhard Friess Page 1 of 1

It is certified that error appears in the above-identified patent and that said Letters Patent is hereby corrected as shown below:

On the Title Page:

(75) Inventors should read:   Bernhard Friess, ~~Retsch~~ Ketsch (DE); Grana Nawabi, Bad Schönborn (DE); Rudi Kraus, Ellerstadt (DE)

Signed and Sealed this  
Twenty-third Day of July, 2013

Teresa Stanek Rea  
*Acting Director of the United States Patent and Trademark Office*